United States Patent
Decker

(10) Patent No.: US 11,059,750 B2
(45) Date of Patent: Jul. 13, 2021

(54) SINGLE ADDITIVE REFRACTORY MATERIALS SUITABLE FOR MULTIPLE APPLICATION METHODS

(71) Applicant: Stellar Materials LLC, Boca Raton, FL (US)

(72) Inventor: Jens Decker, Ann Arbor, MI (US)

(73) Assignee: STELLAR MATERIALS, LLC, Tonawanda, NY (US)

( * ) Notice: Subject to any disclaimer, the term of this patent is extended or adjusted under 35 U.S.C. 154(b) by 0 days.

(21) Appl. No.: 16/478,151

(22) PCT Filed: Jan. 25, 2018

(86) PCT No.: PCT/US2018/015173
§ 371 (c)(1),
(2) Date: Jul. 16, 2019

(87) PCT Pub. No.: WO2018/140567
PCT Pub. Date: Aug. 2, 2018

(65) Prior Publication Data
US 2019/0367412 A1 Dec. 5, 2019

Related U.S. Application Data

(60) Provisional application No. 62/450,150, filed on Jan. 25, 2017.

(51) Int. Cl.
| | | |
|---|---|---|
| *C04B 28/06* | (2006.01) | |
| *C04B 40/00* | (2006.01) | |
| *C04B 22/08* | (2006.01) | |
| *C04B 14/30* | (2006.01) | |
| *C04B 14/32* | (2006.01) | |
| *C04B 24/32* | (2006.01) | |
| *F27D 1/00* | (2006.01) | |
| *F27D 1/16* | (2006.01) | |
| *C04B 103/10* | (2006.01) | |
| *C04B 103/40* | (2006.01) | |
| *C04B 111/00* | (2006.01) | |
| *C04B 111/20* | (2006.01) | |

(52) U.S. Cl.
CPC ............ *C04B 28/06* (2013.01); *C04B 14/303* (2013.01); *C04B 14/324* (2013.01); *C04B 22/085* (2013.01); *C04B 24/32* (2013.01); *C04B 40/0042* (2013.01); *F27D 1/0006* (2013.01); *F27D 1/16* (2013.01); *C04B 2103/10* (2013.01); *C04B 2103/408* (2013.01); *C04B 2111/00172* (2013.01); *C04B 2111/2084* (2013.01)

(58) Field of Classification Search
CPC ... C04B 35/10; C04B 35/101; C04B 35/1015; C04B 35/103; C04B 35/105; C04B 35/106; C04B 35/107; C04B 22/085
See application file for complete search history.

(56) References Cited

U.S. PATENT DOCUMENTS

| | | | |
|---|---|---|---|
| 2,218,244 A | 10/1940 | Lathe et al. | |
| 3,561,987 A | 2/1971 | Jacobs et al. | |
| 3,817,770 A * | 6/1974 | Rodrigues-Schroer | ...................... C04B 28/06 106/694 |
| 4,026,723 A | 5/1977 | Grof et al. | |
| 2004/0149174 A1 | 8/2004 | Farrington et al. | |
| 2005/0239630 A1 | 10/2005 | Oba et al. | |
| 2007/0221099 A1* | 9/2007 | Mintz | ................... C04B 40/065 106/692 |
| 2012/0097072 A1* | 4/2012 | Turpin, Jr. | ............ C04B 20/008 106/634 |
| 2012/0252653 A1* | 10/2012 | Rodrigues-Schroer | ...................... C04B 28/06 501/123 |
| 2013/0189493 A1* | 7/2013 | Decker | ..................... F27D 1/04 428/172 |

FOREIGN PATENT DOCUMENTS

| | | | | |
|---|---|---|---|---|
| CN | 104649689 A | 5/2015 | | |
| EP | 1964826 A2 | 9/2008 | | |
| FR | 2798091 A1 * | 3/2001 | ......... | B05B 11/3094 |
| WO | 9837980 A1 | 9/1998 | | |
| WO | 2012134675 A2 | 10/2012 | | |

OTHER PUBLICATIONS

Extended European Search Report issued in European Patent Application No. 18745202.4, dated Sep. 23, 2020, 8 pgs.

* cited by examiner

Primary Examiner — Karl E Group
(74) Attorney, Agent, or Firm — Haynes and Boone, LLP

(57) ABSTRACT

Processes of forming or repairing a structure for use in high temperature applications may include intermixing a sodium nitrite ($NaNO_2$) additive with a refractory material; and applying the refractory material to a structure surface.

19 Claims, No Drawings

SINGLE ADDITIVE REFRACTORY MATERIALS SUITABLE FOR MULTIPLE APPLICATION METHODS

CROSS-REFERENCE TO RELATED APPLICATIONS

This application claims priority to U.S. Provisional Patent Application Ser. No. 62/450,150 filed Jan. 25, 2017, which is incorporated by reference herein in its entirety.

FIELD

The present disclosure relates in general to refractory materials and processes to apply the refractory materials to a surface. In particular refractory materials, systems and processes of their use provided herein form a monolithic surface useful in a wide array of high temperature applications.

BACKGROUND

High temperature vessels used for molten metal or material incineration are lined with refractory materials to contain the heat of the internal space or contents. Such refractories must not only be capable of resisting thermal stresses, but must also be resistant to chemical and physical wear.

Typical refractory materials are installed as previously fired brick linings, cast in situ as monolithic materials, or are provided as pre-cast shapes that have been fired prior to installation. Monolithic refractory materials can be installed with a variety of installation methods such as casting, ramming, pneumatic dry gunning, pumping and wet shotcrete. In order to obtain the individual installation characteristics it is necessary to design the material formulations for each specific installation method. For instance, ramming materials require pliability and non-slump properties, whereas casting grades require good flow or high slump. As another example, refractory material suitable for dry gunning usually contains less fine particle materials than casting grades. Less fine particle material present in the refractory material reduces the particle surface area that needs to be wetted at the nozzle.

The material properties necessary for individual installation methods are adjusted with additives such as dispersants that promote flow and reduce water demand for refractory and pumping mixes. Other additives like polysaccharides and clays promote non-slump properties necessary for ramming mixes and pneumatic dry gunning mixes to allow pliability and low rebound. For the wet shot-crete process, a setting accelerator is typically added at the nozzle for instant setting once the material hits a surface. All these different additives make monolithic material design very complex.

Additionally, due to the different application requirements, field installations commonly require several different materials on the job for different installation situations. For instance ramming mixes for burners, low water demand castables for impact and high wear areas, dry gunning for roof sections and wet shot-crete material for larger wall sections. Unfortunately, it is not always possible to predict the scope of work and related material quantities until a proper inspection is performed, which is possible only if the furnace is cooled down and scaffolding has been installed. This can create further problems because most refractory materials have longer supply lead times requiring often excessive amounts of material upfront without knowing the scope of work and whether the provided quantities are sufficient for the individual applications.

SUMMARY

Ongoing needs exist to improve refractory systems and application of the refractory system that that the refractory systems do not require numerous upfront materials and complex installation procedures, and are able to be readily applied using several application methods.

According to one or more embodiments, processes of forming or repairing a structure for use in high temperature applications include intermixing a sodium nitrite ($NaNO_2$) additive with a refractory material; and applying the refractory material to a structure surface.

In one or more embodiments of this disclosure, a refractory composition includes a low cement refractory material and a sodium nitrite ($NaNO_2$) additive. The refractory material includes between 50 weight percent and 85 weight percent alumina. The sodium nitrite additive, includes a sodium nitrite solution having a 1 weight percent to 8 weight percent of sodium nitrite based on the total weight of the sodium nitrite solution, and of from 1 weight percent to 10 percent based on the total weight of refractory material. Optionally, a dispersant may be incorporated into the refractory composition. The dispersant is chosen from a phosphate, polycarboxylate, polyglycolether, polyacrylate, and combinations thereof.

DETAILED DESCRIPTION

The following description of particular aspect(s) is merely exemplary in nature and is not intended to limit the scope of the invention, its application, or uses, which may, of course, vary. The disclosure is provided with relation to the non-limiting definitions and terminology included herein. These definitions and terminology are not designed to function as a limitation on the scope or practice of the invention but are presented for illustrative and descriptive purposes only. While the processes or components are described as an order of individual steps or using specific materials, it is appreciated that steps or materials presented herein or their equivalents may be interchangeable such that the description may include multiple parts or steps arranged in many ways as is readily appreciated by one of skill in the art.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise indicated, all numbers expressing distance, size, or other dimension that are modified by the term "about" or "approximate" or "approximately" as used in the specification and claims are to be understood to vary to the smallest significant figure. Additionally, the disclosure of any ranges in the specification and claims are to be understood as including the range itself and also anything subsumed within the range, as well as endpoints. Unless otherwise indicated, the numerical properties set forth in the specification and claims are approximations that may vary depending on the desired properties sought to be obtained in embodiments of the present disclosure. Notwithstanding that numerical ranges and parameters setting forth the broad scope of the disclosure are approximations, the numerical values set forth in the specific examples are reported as precisely as possible.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The materials and processes of this disclosure incorporate a sodium nitrite additive into a refractory material that allows the installation properties of a refractory material for multiple installation methods, such as casting, pumping, pneumatic dry gunning, ramming, and wet shot-crete. The sodium nitrite additive may be added at the site of application according to the scope of the application method.

Embodiments of disclosure include processes of forming or repairing a structure for use in high temperature applications. In one or more embodiments, the process includes intermixing a sodium nitrite ($NaNO_2$) additive with a refractory material and applying the refractory material to a structure surface, optionally a structure surface that deviates from the or excludes the horizontal such as a floor, but includes a roof or other overhang structure.

The term "refractory material" means materials, optionally non-metallic materials, having chemical and physical properties that make them applicable for structures, or as components of systems, that are exposed to environments above 1,000° F. (811 K; 538° C.), which is in accordance with the Standard Terminology Relating to Refractories ASTM C71 incorporated by reference into this disclosure in its entirety.

The term "dry refractory material" excludes material that is a liquid when at standard temperature and pressure (STP) (temperature of 22.5±2.5° C. and a pressure of approximately 1 atmosphere). For example, the total weight based on the dry refractory material does not include the weight of the water or solvent.

In one or more embodiments, the refractory material includes an aggregate component and a binder. In some embodiments of the refractory material, the aggregate component is present from 50 to 95 total dry weight percent. The aggregates component may be chosen from, but is not limited to: flint clay, mulcoa, basalt, olivine, diatomite, vermiculite, perlite, molochite, gibbsite, kyanite, mullite, chromite, tabular alumina, silicon oxide, silica, calcined bauxite, chrome oxide, zirconia, phosphate rock, and mixtures thereof. Additionally, the aggregate component may include alumina and optionally at a final compositional alumina weight percent of 50 to 85. The particle sizes of the aggregate component may range from 0.1 to 1000 microns. It should be appreciated that the aggregate particles can be in a variety of forms including spherical, polyhedral, irregular, and combinations thereof.

In one or more embodiments, the refractory material may include a low cement refractory material. The term "low cement" means a material containing calcium oxide of at least 0.2% by weight, but having less than 2.5% by weight thereof. Optionally, the refractory material may include mullite material, aluminum oxide, calcium aluminate cement, calcined alumina, reactive alumina, microsilica, and polyethylene glycol, and combinations thereof. Optionally, the refractory material may comprise from 50.0 to 75.0 weight percent mullite material based on total amount of dry refractory material, in which the mullite material includes from 50.0 to 65.0 percent aluminum oxide. Optionally, the refractory material may include: from 3.0 to 10.0 weight percent calcium aluminate cement; from 10.0 to 25.0 weight percent calcined alumina; from 4.0 to 15.0 weight percent microsilica; and from 0.1 to 2.0 weight percent polyethylene glycol based on total amount of dry refractory material. Optionally, the refractory material may comprise from 2.0 to 5.0 weight percent reactive alumina based on total amount of dry refractory material.

Illustrative examples of such refractory materials include those that are formed from alumina and a cement based component such as a calcium aluminate. Additionally, an illustrative embodiment of a low cement refractory may be an alumina based refractory that includes: 70 weight percent mullite material (e.g. Mulcoa 60 aggregate) 4 mesh to 325 mesh (typical 58.6 wt % $Al_2O_3$); 5 weight percent calcium aluminate cement (e.g. Secar 71); 6 weight percent microsilica (e.g. Elkem 966); 15 weight percent calcined alumina (e.g. from Almatis); 0.08 weight percent polyethylene glycol, and 3.92 weight percent reactive alumina (e.g. from Almatis).

In some embodiments, the refractory material may further include a dispersant. The dispersant may be chosen from a phosphate, polycarboxylate, polyglycolether, polyacrylate based material, or any combination thereof. Illustrate examples of materials with a phosphate based dispersant are illustratively described in U.S. Pat. No. 7,503,974, and U.S. patent application Ser. No. 13/577,305 (also published as US 2012/0304904), and herein incorporated by reference. Other materials may also be used such as a variety commercially available materials from Stellar Materials, Inc., Boca Raton., Fla., illustratively Thermbond 7004 or Thermblock 85. Illustrative examples of materials and methods of their production can be found in U.S. Pat. Nos. 6,447,596; and 5,888,292, and herein incorporated by reference.

The dispersant may be intermixed with the refractory material optionally at an overall concentration of 1.0 weight percent to 10.0 weight percent based on the total weight of the dry matter, or any value or range therebetween. Optionally, the dispersant may be intermixed with the dry refractory material at an overall concentration of 3.0 weight percent to 7.0 weight percent, or any value or range therebetween. Optionally, a dispersant is intermixed with the dry refractory material at an overall weight percent concentration of 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0.

In embodiments, the sodium nitrite additive is present in a sodium nitrite solution. The sodium nitrite solution may include sodium nitrite dissolved in an appropriate solvent, optionally water, optionally at a ratio of 50 grams (g) to 800 g dry sodium nitrite powder per 10,000 g water. In this disclosure, the term "water" may include, but is not limited to, deionized water, purified water, spring water, brackish water, or water available from water treatment plants. The water may contain trace amount of calcium, sodium, fluoride and other ions regularly found in drinking water.

In some embodiments, the sodium nitrite solution prior to intermixing with the refractory may include from approximately 0.10 to approximately 40.0 weight percent sodium nitrite based on the total weight of the solution (i.e. sodium nitrite and water). Optionally, the sodium nitrite solution may include from 0.1 to 8.0 weight percent weight percent based on the total weight of the solution. Optionally, the sodium nitrite solution may include from approximately 1.0 weight percent to 8.0 weight percent based on the total weight of the solution. All individual values and subranges encompassed by "from 0.1 to 40.0 weight percent" are disclosed herein as separate embodiments.

The sodium nitrite solution, in some aspects, is then intermixed with a refractory material either prior to or at the point of applying the refractory material to a structure surface. The amount of sodium nitrite additive mixed with the refractory material upon application is optionally from 0.01 to 4.0 weight percent, optionally from 0.1 to 3.0 weight percent, optionally 0.3 to 2.5 weight percent relative to the combined sodium nitrite solution/refractory total weight. In some aspects, the amount of sodium nitrite in the final mixture is 0.1 to 1.0 weight percent based on the combined weight of dry material and sodium nitrite solution. In some aspects, such as when the refractory material is applied by processes such as shotcrete, the final amount of sodium nitrate is from 1.0 weight percent to 3.0 weight percent, optionally 1.5 weight percent to 2.0 weight percent. In other aspects, such as when the sodium nitrite additive is mixed with the refractory material for applications such as ramming or gunning, the final amount of sodium nitrite may be from 0.05 to approximately 1.0 weight percent sodium nitrite based on the combined weight of the dry refractory material and the sodium nitrite solution. In other aspects, the amount sodium nitrite may be from 0.1 to 1.0 weight percent, from 0.1 to 0.75 weight percent, or from 0.1 to 0.5 weight percent based on the combined weight of the dry refractory material and the sodium nitrite solution.

In one or more embodiments of the process forming or repairing a structure for use in high temperature applications, the water or solvent in the refractory material at application to a surface is from 1 weight percent to 10 weight percent based on the total weight of the refractory material. Optionally, the refractory material includes low water additions. The term "low water additions" means that there is from 1.0 to 6.0 weight percent water based on the total weight of the refractory material. In some embodiments, the water in the refractory material is less than 10 weight percent based on the total weight of the refractory material, optionally less than 6 weight percent water. All individual values and subranges encompassed by "from 1.0 to 10.0 weight percent" are disclosed herein as separate embodiments.

In one or more embodiments, when the refractory material is applied by ramming processes as an example, the amount of water in the refractory material is less than 6.0 weight percent based on the total weight of the refractory material. Unlike conventional ramming materials, the mixing can be done at low water additions. Low water additions decrease the high drying shrinkage of about 1% or greater with conventional phosphate bonded plastic ramming materials. The drying shrinkage of the castable grade ramming mix using the sodium nitrite solution is less 0.1%. Without intent to be bound by theory, it is believed that the low water additions decreases or prevents cracking after firing or even open cracks at operating temperature.

It was found that when the sodium nitrite solution contains a lower amount of sodium nitrite (less than 10 weight percent), and the sodium nitrite solution is mixed with a low cement refractory material that also includes a dispersant, the dispersant is activated after 2 to 3 minutes of mixing. The sodium nitrite solution transforms the refractory material into a pliable non-slump material without further setting. The refractory material stays pliable for an additional 30 to 60 minutes until hardening slowly occurs.

In embodiments of the process of forming or repairing a structure for use in high temperature applications, the refractory material may be applied to a structure surface. The structure surface may be the inside wall of a furnace, kiln, incinerator, or reactor, and may include ceramic, metal or wood. In one or more embodiments, the method for applying refractory material may include casting, pumping, pneumatic dry gunning, ramming and wet shot-crete.

In one or more embodiments, the dry refractory material is pre-mixed for 5 to 30 or for 2 to 10 minutes, then the sodium nitrite solution is poured slowly into the dry material while the mixer is running. The refractory material and the sodium nitrite solution is mixed within 5 minutes of applying the refractory material to the structure surface. In some embodiments, the dry sodium nitrite is pre-mixed with the dry refractory material, and then water is adding to the dry refractory material. When the dry refractory material and the water are intermixed, the refractory material is applied to the structure surface.

In some embodiments, such as when the refractory material is applied by pneumatic gunning process, a percentage of the sodium nitrite solution or water may be added to a mixer for pre-dampening. The remaining sodium nitrite solution or water may be added at the nozzle. In some embodiments, 25% to 75% of total amount of the sodium nitrite solution may added for pre-dampening prior to charging the material to a gunite machine and 25% to 75% of total amount of the sodium nitrite solution is added at the nozzle. Pre-dampening may be beneficial in cases of gunning in confined space. Optionally, 100% of the sodium nitrite solution is incorporated into the refractory material at the nozzle.

Conventional pneumatic dry-gunning applications create more dust than wet-application processes, which historically prevents the use of fine particle refractory material. In one or more embodiments, when the refractory material is applied in pneumatic dry-gunning applications, the use of sodium nitrite solution promotes wetting at the nozzle leading to very low dust during gunning. Thus, the refractory material as used in the provided processes or materials may contain a fine powder content of approximately less than 45 micron in particle size, which is finer than conventional low cement gunning mixes. Without intent to be bound by theory, it is believed that the sodium nitrite solution decreases the amount of dust that may occur when the refractory material is applied to the structure surface.

Additionally, when the refractory material further comprises a dispersant, the weight percent of water decreases compared to the weight percent of water in refractory application processes that does not use the sodium nitrite additive. The refractory material appears wet on the structure surface, but it does not slump due to the reaction of sodium nitrite additive. Without intent to be bound by theory, it is believed that the sodium nitrite additive offsets the activity of the dispersant. This allows very low rebound rates because larger aggregates become well incorporated into the wet substrate. Cut cross sections of gunned and fired test panels show the same grain size distribution as like cast materials. There is no obvious loss of grain components from rebound.

Various aspects of the present invention are illustrated by the following non-limiting examples. The examples are for illustrative purposes and are not a limitation on any practice of the present invention. It will be understood that variations and modifications can be made without departing from the spirit and scope of the invention. Reagents illustrated herein are commercially available, and a person of ordinary skill in the art readily understands where such reagents may be obtained.

EXEMPLARY ASPECTS

It should now be understood that the various aspects of the process of forming or repairing a structure for use in high temperature applications are described and such aspects may be utilized in conjunction with various other aspects:

In a first aspect, the disclosure provides a process of forming or repairing a structure for use in high temperature applications. The process includes intermixing a sodium nitrite (NaNO$_2$) additive with a refractory material; and applying the refractory material to a structure surface.

In second aspect, the disclosure provides the process of the first aspect in which the sodium nitrite additive comprises a sodium nitrite solution at 1.0 weight percent to 8.0 weight percent sodium nitrite based on the total weight of the solution.

In a third aspect, the disclosure provides the process of the second aspect, in which the sodium nitrite solution is an aqueous solution.

In a fourth aspect, the disclosure provides the process of any of the first through third aspects, in which the sodium nitrite (NaNO$_2$) additive is intermixed with the refractory material within five minutes prior to applying the refractory material to the structure surface.

In a fifth aspect, the disclosure provides the process of any of the first through fourth aspects, in which the refractory material comprises a low cement refractory material having less than 2.5 weight percent calcium oxide.

In a sixth aspect, the disclosure provides the process of any of the first through fourth aspects, in which applying the refractory material comprises casting, pumping, pneumatic dry gunning, ramming, or wet shot-crete methods.

In a seventh aspect, the disclosure provides the process of any of the first through sixth aspects, in which the refractory material comprises alumina.

In an eighth aspect, the disclosure provides the process of any of the first through seventh aspects, in which the refractory material further comprises a dispersant selected from the group consisting of: a phosphate; polycarboxylate; polyglycolether; polyacrylate; and combinations thereof.

In a ninth aspect, the disclosure provides the process of any of the first through eighth aspects, in which the process further comprises adding a dispersant to the refractory material prior adding the sodium nitrite (NaNO$_2$) additive, wherein the amount of dispersant is of from 0.08 weight percent to 1.0 weight percent based on the total weight of the refractory material.

In a tenth aspect, intermixing a sodium nitrite solution with a refractory material, the sodium nitrite solution comprising 0.01 weight percent to 8.0 weight percent sodium nitrite based on the total weight of the solution; wherein the additive is intermixed at a weight percent of 1.0 weight percent to 10.0 weight percent sodium nitrite based on the combined weight of the dry refractory material and the sodium nitrite solution; and applying the refractory material with a structure surface.

In an eleventh aspect, the disclosure provides the process of the tenth, in which the applying the refractory material comprises casting, pumping, pneumatic dry gunning, ramming, or wet shot-crete methods.

In a twelfth aspect, the disclosure provides the process of any of the tenth or eleventh aspects, in which the refractory material comprises less than 2.5 weight percent calcium oxide.

In a thirteenth aspect, the disclosure provides the process of any of the tenth through twelfth aspects, in which the refractory material comprises alumina.

In a fourteenth aspect, the disclosure provides the process of any of the tenth through thirteenth aspects, in which the refractory material comprises a dispersant selected from the group consisting of: a phosphate; polycarboxylate; polyglycolether; polyacrylate; and combinations thereof.

In a fifteenth aspect, the disclosure provides the process of any of the tenth through fourteenth aspects, in which the dispersant is present in the refractory material prior to the addition of the sodium nitrite additive at an amount of 0.08 to 1.0 weight percent based on the weight of the dry refractory material.

In a sixteenth aspect, a process of forming or repairing a structure for use in high temperature applications includes: intermixing a sodium nitrite additive with a refractory material, the sodium nitrite additive comprising a sodium nitrite powder and water, wherein the amount of sodium nitrite powder is from 1.0 weight percent to 40 weight percent the total weight of the sodium nitrite solution and from 0.10 weight percent to 10 percent based on the combined weight of the dry refractory material and the sodium nitrite additive; and applying the refractory material to a structure surface by casting, pumping, pneumatic dry gunning, ramming, wet shot-crete methods, or combination thereof; the refractory material comprising a dispersant selected from the group consisting of a phosphate, polycarboxylate, polyglycolether, polyacrylate, and combinations thereof; the refractory material comprising between 50 weight percent and 85 weight percent alumina.

In an seventeenth aspect, the disclosure provides the process of the sixteenth, in which the dispersant is in amount of from 0.08 weight percent to 1.0 weight percent or in amount of from 0.08 weight percent to 0.1 weight percent.

In a eighteenth aspect, the disclosure provides the process of one of the sixteenth or seventeenth aspects, in which the intermixing further comprises low water additions.

In a nineteenth aspect, the disclosure provides the process of any one of the sixteenth to eighteenth aspects, in which the refractory material comprises less than 2.5 weight percent calcium oxide.

In a twentieth aspect, the disclosure provides a refractory composition that includes a low cement refractory material, wherein the low cement refractory material comprises from 50 weight percent to 85 weight percent alumina; a sodium nitrite additive, wherein the sodium nitrite additive comprises a sodium nitrite solution having from 1 weight percent to 8 weight percent of sodium nitrite (NaNO$_2$) based on the total weight of the sodium nitrite solution and of from 1 weight percent to 10 percent based on the total weight of refractory material; and optionally, a dispersant chosen from: a phosphate; polycarboxylate; polyglycolether; polyacrylate; and combinations thereof.

EXAMPLES

Example 1: Formation of a Ramming Material and Application

A 60% alumina based castable with 5% calcium aluminate cement and a polyglycol based dispersant (0.1 wt % or 0.08 wt % polyethylene glycol) (70 weight percent mullite material (e.g. Mulcoa 60 aggregate) 4 mesh to −325 mesh (typical 58.6 wt % $Al_2O_3$), 5 weight percent calcium aluminate cement (e.g. Secar 71), 6 weight percent microsilica (e.g. Elkem 966), 15 weight percent calcined alumina (e.g. from Almatis), 0.08 weight percent polyethyleneglycol, and 3.92 weight percent reactive alumina (e.g. from Almatis)) was mixed to form the dry refractory material. The dry refractory material was mixed with a 2.8% sodium nitrite solution at an amount of 5.5 weight percent (based on the combined weight of the dry refractory material and the sodium nitrite solution). After mixing the material for 5 minutes, the material was rammed overhead with a pneumatic ramming hammer without slump. The working time was 30 minutes the setting time around 3 hours. The final cold crushing strengths after firing at 1500° F. was 18000 PSI, the ASTM C 704 abrasion loss 4.5 cc and the shrinkage of less than 0.1%.

Example 2: Formation of a Pneumatic Dry Gunning Material and Application

A 60% alumina based refractory with 5% calcium aluminate cement and a polyglycol based dispersant (0.1 wt % or 0.08 wt % polyethylene glycol) (70 weight percent mullite material (e.g. Mulcoa 60 aggregate) 4 mesh to −325 mesh (typical 58.6 wt % $Al_2O_3$), 5 weight percent calcium aluminate cement (e.g. Secar 71), 6 weight percent microsilica (e.g. Elkem 966), 15 weight percent calcined alumina (e.g. from Almatis), 0.08 weight percent polyethyleneglycol, and 3.92 weight percent reactive alumina (e.g. from Almatis)) was gunned with a pneumatic rotary bowl concrete gunning machine at a rate of 2500 lb per hour. At the nozzle, a 2.8% by weight sodium nitrite solution was added with a high pressure pump at 200 PSI, to a final amount of 5.5 weight percent sodium nitrite solution (based on the combined weight of the dry refractory and the sodium nitrite solution). The overall rebound was less than 10%. The final cold crushing strengths after firing at 1500° F. was 12000 PSI, the ASTM C 704 abrasion loss 7 cc and the shrinkage was less than 0.15%.

The same refractory material can be mixed with regular water absent sodium nitrite for casting and pumping purposes at rates between 4.5% and 5.5% depending on the installation situation and desired properties.

Example 3: Formation of a Ramming Material and Application

An 82% alumina based castable with 2% calcium aluminate cement and a polyglycol based dispersant (0.1 wt % or 0.08 wt % polyethylene glycol) (77 weight percent bauxite material 3 mesh to −325 mesh (typical 85 wt % $Al_2O_3$), 2 weight percent calcium aluminate cement (e.g. Secar 71), 5 weight percent microsilica (e.g. Elkem 966), 12 weight percent calcined alumina (e.g. from Almatis), 0.06 weight percent polyethylene glycol, and 3.94 weight percent reactive alumina (e.g. from Almatis)) was mixed to form the dry refractory material. The dry refractory material was mixed with 2.8% sodium nitrite sodium nitrite solution to a final amount of 4.3 weight percent sodium nitrite solution (based on the combined weight of the dry refractory material and the sodium nitrite solution). After 5 minutes mixing the material was rammed overhead with a pneumatic ramming hammer without slump.

Example 4: Formation of a Ramming Material and Application

A silicon carbide based castable with 5% calcium aluminate cement and a polyglycol based dispersant (0.1 weight percent (wt %) or 0.08 wt % polyethylene glycol) (72 weight percent silicon carbide material 4 mesh to −325 mesh (typical 98% SiC, Electro Abrasives), 5 weight percent calcium aluminate cement (e.g. Secar 71), 7 weight percent microsilica (e.g. Elkem 966), 12 weight percent calcined alumina (e.g. from Almatis), 0.08 weight percent polyethylene glycol, and 3.92 weight percent reactive alumina (e.g. from Almatis)) to form the dry refractory material. The dry refractory material was mixed with 5% sodium nitrite solution to a final amount of 4.3 weight percent sodium nitrite solution (based on the combined weight of the dry refractory material and the sodium nitrite solution). After 5 minutes, the mixed material was rammed overhead with a pneumatic ramming hammer without slump.

Example 5: Formation of a Ramming Material and Application

A 50% alumina based castable with 20% silicon carbide additions and 5% calcium aluminate cement and a polyglycol based dispersant (0.1 wt % or 0.08 wt % polyethylene glycol) (53 weight percent mullite material (e.g. Mulcoa 60 aggregate) 4 mesh to −325 mesh (typical 58.6 wt % $Al_2O_3$), 20 weight percent SiC (98% SiC Electro Abrasives)<35 mesh, 5 weight percent calcium aluminate cement (e.g. Secar 71), 6 weight percent microsilica (e.g. Elkem 966), 15 weight percent calcined alumina (e.g. from Almatis), 0.08 weight percent polyethylene glycol, and 3.92 weight percent reactive alumina (e.g. from Almatis)) was mixed with 2.8% sodium nitrite in water to a final amount of 5.5 weight percent additive solution to refractory. After 5 minutes mixing the material was rammed overhead with a pneumatic ramming hammer without slump.

Example 6: Formation of a Ramming Material and Application

A 60% alumina based castable with 0.2% calcium oxide and a polyglycol based dispersant (0.1 wt % or 0.08 wt % polyethylene glycol) (70 weight percent mullite material (e.g. Mulcoa 60 aggregate) 4 mesh to −325 mesh (typical 58.6 wt % $Al_2O_3$), 0.6 weight percent calcium aluminate cement (e.g. Secar 71), 6 weight percent microsilica (e.g. Elkem 966), 15 weight percent calcined alumina (e.g. from Almatis), 3% hydratable alumina (Dynabond Aluchem), 0.08 weight percent polyethylene glycol, and 3.92 weight percent reactive alumina (e.g. from Almatis)) was mixed with 2.8% sodium nitrite in water to a final amount of 5.5 weight percent additive solution to refractory. After 5 minutes mixing the material was rammed overhead with a pneumatic ramming hammer without slump.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents and publications mentioned in the specification are indicative of the levels of those skilled in the art to which the invention pertains. These patents and publications are incorporated herein by reference to the same extent as if each individual application or publication was specifically and individually incorporated herein by reference.

I claim:

1. A process of forming or repairing a structure for use in high temperature applications comprising:
intermixing a sodium nitrite ($NaNO_2$) additive with a refractory material to form a refractory mixture; and
applying the refractory mixture to a structure surface;
wherein the sodium nitrite additive is a sodium nitrite solution having 0.1 weight percent to 10.0 weight percent sodium nitrite based on the total weight of the solution;
wherein the refractory mixture further comprises a dispersant selected from the group consisting of: a phosphate; polycarboxylate; polyglycolether; polyacrylate; and combinations thereof.

2. The process of claim 1, wherein the sodium nitrite solution is an aqueous solution.

3. The process of claim 1, wherein the sodium nitrite additive is intermixed with the refractory material within five minutes prior to applying the refractory mixture to the structure surface.

4. The process of claim 1, wherein the refractory material comprises a low cement refractory material having less than 2.5 weight percent calcium oxide.

5. The process of claim 1, wherein applying the refractory mixture comprises casting, pumping, pneumatic dry gunning, ramming, or wet shot-crete methods.

6. The process of claim 1, wherein the refractory material comprises alumina;
and the refractory material comprises 4.0 to 15.0 weight percent microsilica based on a total weight of the refractory material.

7. The process of claim 1, wherein the process further comprises adding the dispersant to the refractory material prior adding the sodium nitrite additive, wherein the amount of dispersant is from 0.08 weight percent to 1.0 weight percent based on the total weight of the refractory material.

8. A process of forming or repairing a structure for use in high temperature applications comprising:
intermixing a sodium nitrite solution with a refractory material to form a refractory mixture, the sodium nitrite solution comprising 0.01 weight percent to 10.0 weight percent sodium nitrite based on the weight of the solution, wherein the sodium nitrite solution is intermixed at a weight percent of 0.01 weight percent to 4.0 weight percent sodium nitrite based on the combined weight of dry refractory material and the sodium nitrite solution; and
applying the refractory mixture to a structure surface;
wherein the refractory mixture comprises a dispersant selected from the group consisting of: a phosphate; polycarboxylate; polyglycolether; polyacrylate; and combinations thereof.

9. The process of claim 8, wherein the applying the refractory mixture comprises casting, pumping, pneumatic dry gunning, ramming, or wet shot-crete methods.

10. The process of claim 8, wherein the refractory material comprises less than 2.5 weight percent calcium oxide;
and the refractory material comprises 4.0 to 15.0 weight percent microsilica based on a total weight of the refractory material.

11. The process of claim 8, wherein the refractory material comprises alumina.

12. The process of claim 8, wherein the dispersant is present in the refractory material prior to the addition of the sodium nitrite additive at an amount of 0.08 to 1.0 weight percent based on a total weight of the refractory material.

13. A process of forming or repairing a structure for use in high temperature applications comprising:
intermixing a sodium nitrite additive with a refractory material to form a refractory mixture, the sodium nitrite additive comprising a sodium nitrite powder and water, wherein the amount of sodium nitrite powder is from 1.0 weight percent to 8.0 weight percent the total weight of the sodium nitrite additive and from 0.10 weight percent to 10 percent based on the combined weight of the dry refractory material and the sodium nitrite additive; and
applying the refractory mixture to a structure surface by casting, pumping, pneumatic dry gunning, ramming, wet shot-crete methods, or combination thereof;
the refractory material comprising a dispersant selected from the group consisting of a phosphate, polycarboxylate, polyglycolether, polyacrylate, and combinations thereof;
the refractory material comprising between 50 weight percent and 85 weight percent alumina.

14. The process of claim 13, wherein the dispersant is present in the refractory material in amount of from 0.08 weight percent to 1.0 weight percent based on a total weight of the refractory material.

15. The process of claim 13, wherein the intermixing further comprises low water additions.

16. The process of claim 13, wherein the refractory material comprises less than 2.5 weight percent calcium oxide;
and the refractory material comprises 4.0 to 15.0 weight percent microsilica based on a total weight of the refractory material.

17. The process of claim 13, wherein the dispersant is present in the refractory material in amount of from 0.08 weight percent to 0.1 weight percent based on a total weight of the refractory material.

18. The process of claim 1, wherein the sodium nitrite additive consists of sodium nitrite and water.

19. The process of claim 1, wherein the refractory mixture exhibits a drying shrinkage of less than 0.1%.

* * * * *